US012798121B2

(12) United States Patent
Takahashi

(10) Patent No.: US 12,798,121 B2
(45) Date of Patent: Nov. 17, 2026

(54) WORKPIECE SUPPLY ROBOT AND WORKPIECE SUPPLY SYSTEM

(71) Applicant: AMADA CO., LTD., Kanagawa (JP)

(72) Inventor: Yuki Takahashi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 330 days.

(21) Appl. No.: 18/682,501

(22) PCT Filed: Aug. 10, 2022

(86) PCT No.: PCT/JP2022/030529
§ 371 (c)(1),
(2) Date: Feb. 9, 2024

(87) PCT Pub. No.: WO2023/032621
PCT Pub. Date: Mar. 9, 2023

(65) Prior Publication Data

US 2024/0424692 A1 Dec. 26, 2024

(30) Foreign Application Priority Data

Aug. 31, 2021 (JP) ................................ 2021-141211

(51) Int. Cl.
*B25J 15/04* (2006.01)
*B25J 13/08* (2006.01)
*B25J 15/00* (2006.01)

(52) U.S. Cl.
CPC ......... *B25J 15/0491* (2013.01); *B25J 13/084* (2013.01); *B25J 15/0061* (2013.01); *B25J 15/04* (2013.01)

(58) Field of Classification Search
CPC .................. B25J 15/0491; B25J 13/084; B25J 15/0061; B25J 15/04
See application file for complete search history.

(56) References Cited

U.S. PATENT DOCUMENTS 4,587,716 A * 5/1986 Bytow .................... B25J 9/041 83/563
7,123,992 B2 * 10/2006 Ban ........................ B25J 9/1697 700/258

(Continued)

FOREIGN PATENT DOCUMENTS

DE 10 2011 075 625 A1 11/2012
DE 102005009734 B4 10/2016

(Continued)

OTHER PUBLICATIONS

International Search Report for corresponding Application No. PCT/JP2022/030529, mailed Oct. 25, 2022.

(Continued)

*Primary Examiner* — Ryan J. Walters
(74) *Attorney, Agent, or Firm* — Renner, Otto, Boisselle & Sklar LLP

(57) ABSTRACT

The present invention includes a support arm, a permanent robot hand fixedly provided to the support arm and configured to hold a workpiece placed on a workpiece placement platform, and an extending robot hand configured to hold the workpiece together with the permanent robot hand, in which the present invention is configured to be able to transport the workpiece from the workpiece placement platform and the extending robot hand is configured to be removable.

11 Claims, 12 Drawing Sheets

(56) References Cited

U.S. PATENT DOCUMENTS

| | | | | |
|---|---|---|---|---|
| 10,226,865 | B2 * | 3/2019 | Nakayama | B25J 9/1669 |
| 12,528,206 | B2 * | 1/2026 | Asano | B25J 15/0491 |
| 2018/0297200 | A1 * | 10/2018 | Nakayama | B25J 9/1612 |

FOREIGN PATENT DOCUMENTS

| | | | |
|---|---|---|---|
| EP | 3808515 | A1 | 4/2021 |
| JP | H08-112620 | A | 5/1996 |
| JP | 2007-222971 | A | 9/2007 |
| JP | 2015-071207 | A | 4/2015 |
| JP | 2020-203350 | A | 12/2020 |
| KR | 101848215 | B1 | 4/2018 |
| WO | 2018/173089 | A1 | 9/2018 |

OTHER PUBLICATIONS

Written Opinion for corresponding Application No. PCT/JP2022/030529, mailed Oct. 25, 2022.

Extended European Search report for corresponding EP Application No. 22864206.2 dated Jun. 19, 2024.

* cited by examiner

WORKPIECE SUPPLY ROBOT AND WORKPIECE SUPPLY SYSTEM

TECHNICAL FIELD

The present invention relates to a workpiece supply robot and a workpiece supply system.

BACKGROUND ART

Conventionally, a bending robot has been used in a sheet metal bending machine to automatically handle a workpiece (Patent Literature 1 and the like). The bending robot includes a robot arm, and a gripper for gripping the workpiece in a robot head unit at a tip of the robot arm. When a product to be bent is subject to a plurality of bending steps, a size, a shape, and the like of the workpiece to be clamped by the gripper are different for each of the steps. Thus, it may not be possible to clamp the workpiece with a single type of gripper. Therefore, an auto gripper changer provided with a table that includes a plurality of grippers for change has been conventionally used. The auto gripper changer is arranged in proximity to a press brake. In the auto gripper changer, the robot is configured to change a gripper to a required gripper.

CITATION LIST

Patent Literature

Patent Literature 1: Japanese Patent Application Laid-Open Publication No. 8-112620

SUMMARY

Technical Problem

However, in the bending robot of Patent Literature 1, it is necessary to change the gripper as a whole. Therefore, there is a problem in that a sensor necessary to detect the workpiece, a mechanism necessary to hold the workpiece, and the like need to be mounted on all the grippers for change. Further, in the bending robot of Patent Literature 1, since it is necessary to mount the sensors and the necessary mechanism, a configuration of the gripper for change is restricted. As a result, there is a problem in that expendability is limited.

One aspect of the present invention is a workpiece supply robot and a workpiece supply system in which a robot hand can be partially extended.

Solution to Problem

A workpiece supply robot according to one aspect of the present invention includes a support arm, a permanent robot hand fixedly provided to the support arm and configured to hold a workpiece placed on a workpiece placement platform, and an extending robot hand configured to hold the workpiece together with the permanent robot hand, in which the workpiece supply robot is configured to be able to transport the workpiece from the workpiece placement platform, and the extending robot hand is configured to be removable.

A workpiece supply system according to one aspect of the present invention includes the workpiece supply robot and the workpiece placement platform described above, in which the workpiece placement platform includes a storage unit for storing the extending robot hand.

According to the workpiece supply robot and the workpiece supply system according to one aspect of the present invention, by including the extending robot hand configured to be removable, the robot hand can be partially extended without being subject to a restriction due to a common configuration of the robot hands.

Advantageous Effect of Invention

According to a workpiece supply robot and a workpiece supply system according to one aspect of the present invention, a robot hand can be partially extended.

DESCRIPTION OF EMBODIMENT

The best mode for carrying out the present invention will be described below by using the drawings. It should be noted that the following embodiment does not limit the invention according to each claim, and not all combinations of features described in the embodiment are essential for the solution of the invention.

Figure 1:
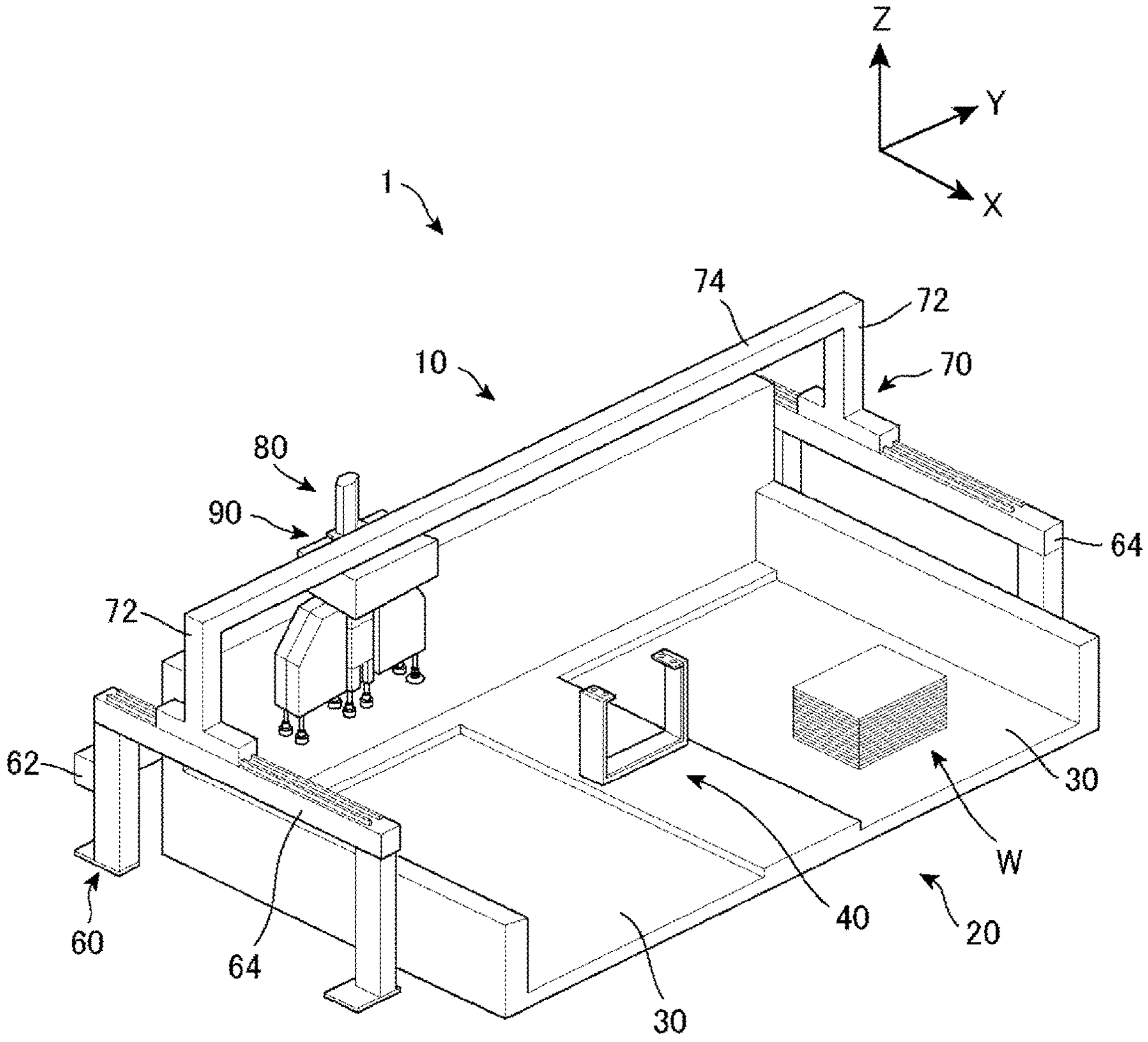
FIG. 1 is a schematic diagram showing a workpiece supply system according to an embodiment of the present invention.

Overall Configuration of Material Management System According to Present Embodiment FIG. 1 is a schematic diagram showing a workpiece supply system according to an embodiment of the present invention.

First, referring to FIG. 1, a workpiece supply system 1 according to the embodiment of the present invention will be outlined. As shown in FIG. 1, the workpiece supply system 1 according to the present embodiment roughly includes a workpiece placement platform 20, and a workpiece supply robot 10 configured to be able to transport, from the workpiece placement platform 20, a workpiece W placed on the workpiece placement platform 20.

Figure 2:
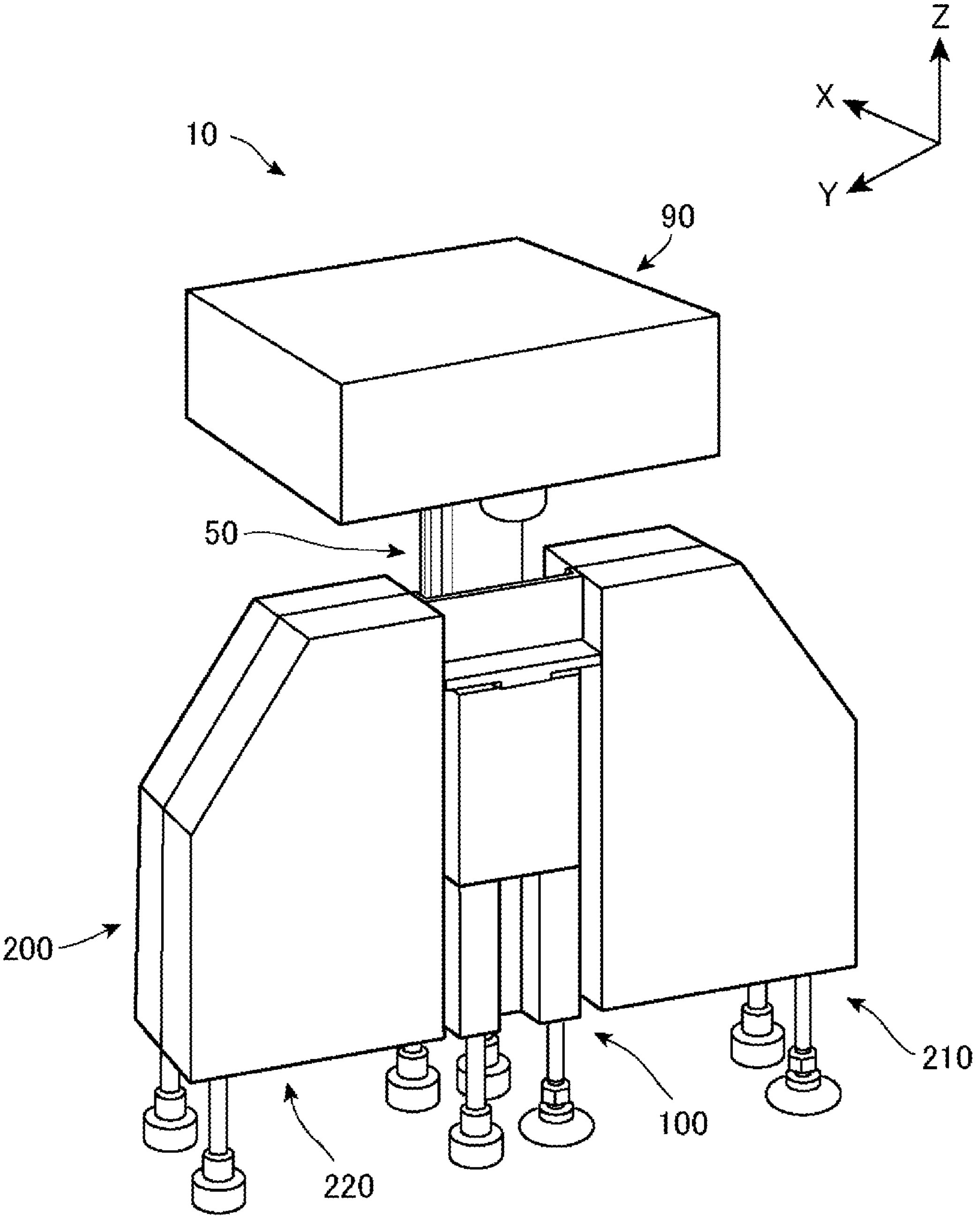
FIG. 2 is a schematic diagram showing a workpiece supply robot of the present embodiment.
Figure 3:
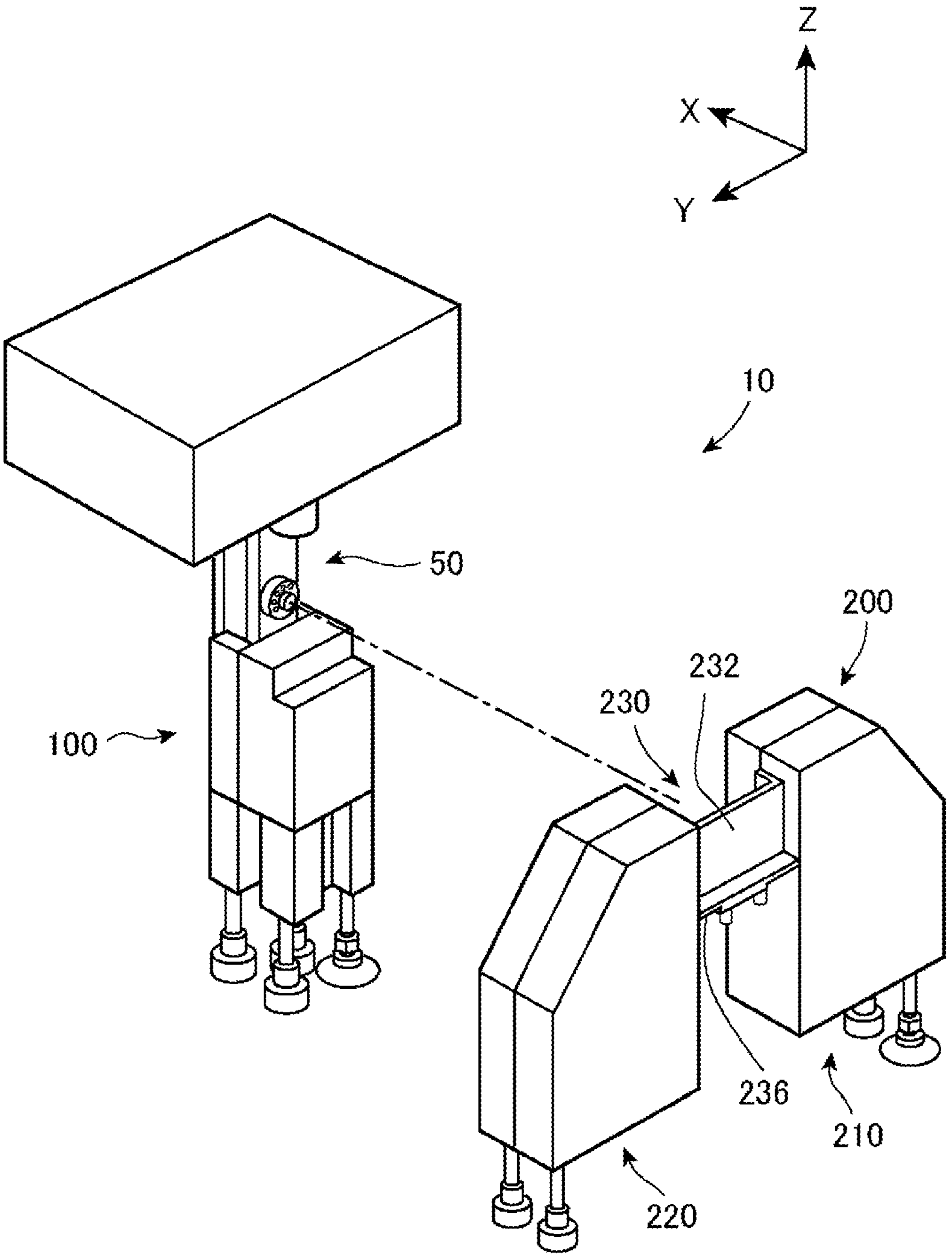
FIG. 3 is a schematic diagram showing the workpiece supply robot of the present embodiment.

FIGS. 2 and 3 are schematic diagrams showing the workpiece supply robot of the present embodiment.

Figure 4:
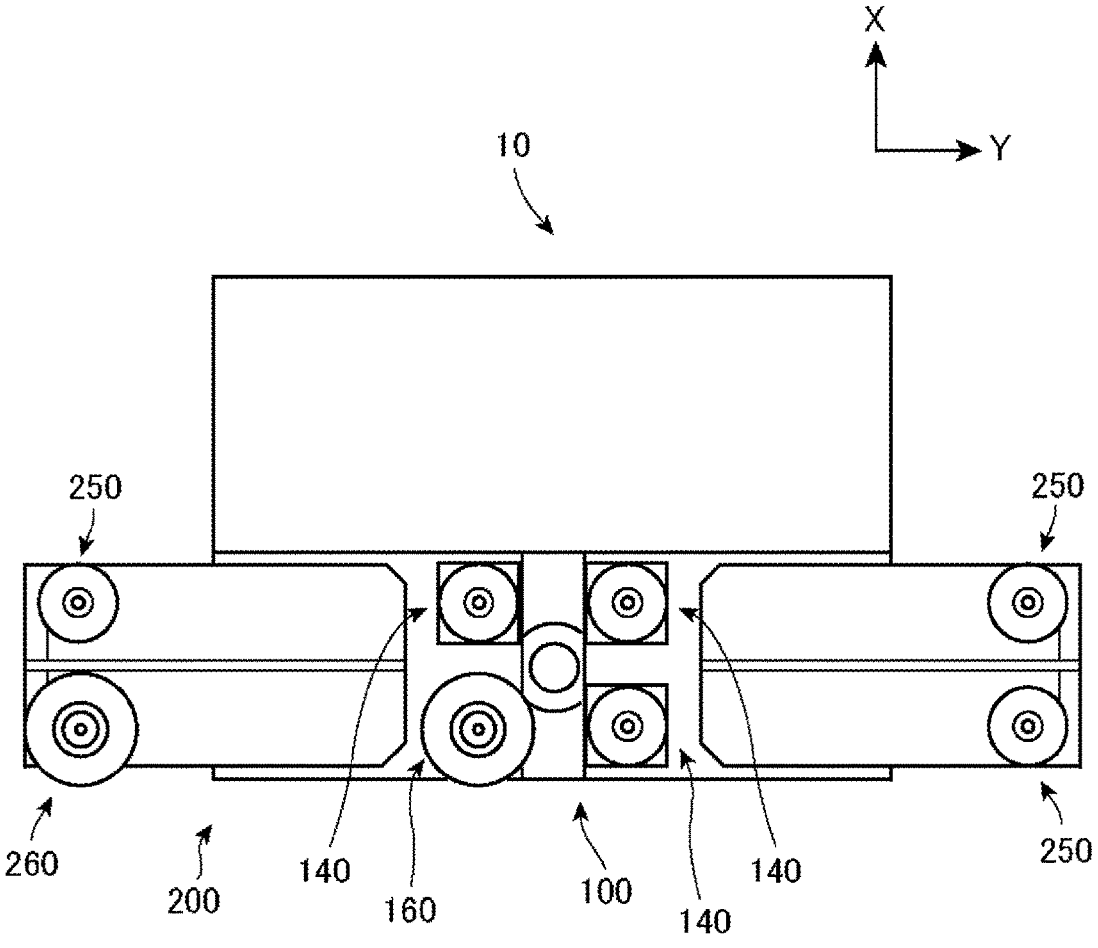
FIG. 4 is a bottom view showing the workpiece supply robot of the present embodiment.

FIG. 4 is a bottom view showing the workpiece supply robot of the present embodiment.

As shown in FIG. 2, the workpiece supply robot 10 includes a support arm 50, a permanent robot hand 100 fixedly provided to the support arm 50 and configured to hold the workpiece W, and an extending robot hand 200 configured to hold the workpiece W together with the permanent robot hand 100. As shown in FIG. 3, the extending robot hand 200 is configured to be removable. As shown in FIG. 4, the workpiece supply robot 10 is configured such that the permanent robot hand 100 and the extending robot hand 200 are aligned in a straight line in a state in which the extending robot hand 200 is installed. As shown in FIG. 1, the workpiece placement platform 20 includes a storage unit 40 for storing the extending robot hand 200. In other words, the workpiece supply system 1 is a workpiece supply system provided with an AGC (Auto Gripper Changer).

It should be noted that in the present specification, "holding" means a generic term for holding actions including gripping and suction of the workpiece W.

[Configuration of Workpiece Supply Robot]

Next, details of each component of the workpiece supply robot 10 will be described.

As shown in FIG. 1, the workpiece supply robot 10 further includes a base frame 60, a gate-shaped movable frame 70, a carriage 80, and a core unit 90. The base frame 60 includes a first frame unit 62 extending in a longitudinal direction of the workpiece placement platform 20 at a back of the workpiece placement platform 20, and a pair of gate-shaped second frame units 64 respectively attached to both ends of the first frame unit 62. The base frame 60 having such a configuration is provided so as to surround the workpiece placement platform 20 in a U-shape.

As shown in FIG. 1, the movable frame 70 includes a set of third frame units 72 respectively provided on the second frame units 64 of the base frame 60 and extending in a vertical direction, and a fourth frame unit 74 extending in the longitudinal direction of the workpiece placement platform 20 so as to straddle above the workpiece placement platform 20 and connected to the third frame units 72 on both sides. The movable frame 70 is configured to be movable on the base frame 60 in an extending direction of the second frame unit 64.

Specifically, a linear motion mechanism (not shown) is provided at an upper part of the second frame unit 64 of the base frame 60. Further, the movable frame 70 is arranged at an upper part of the linear motion mechanism so as to be movable along the linear motion mechanism. The movable frame 70 moves in an X-axis direction by driving of an X-axis motor (not shown) provided at an appropriate position of the third frame unit 72. Further, the carriage 80 is provided to the fourth frame unit 74 of the movable frame 70 so as to be movable in a Y-axis direction.

The carriage 80 moves in the Y-axis direction by driving of a Y-axis motor (not shown) provided at an appropriate position of the movable frame 70. Further, the carriage 80 moves in a Z-axis direction by driving of a Z-axis motor (not shown) provided at an appropriate position of the carriage 80. Furthermore, the core unit 90 is attached to the carriage 80. With such a configuration, the core unit 90 can move in the X-axis direction, the Y-axis direction, and the Z-axis direction above the workpiece placement platform 20 via the carriage 80 and the movable frame 70.

As shown in FIGS. 1 and 2, the core unit 90 is configured such that the support arm 50 can be attached to a bottom part thereof. Further, the core unit 90 includes a rotation motor (not shown) for rotating the support arm 50 around the Z-axis. Further, the core unit 90 is configured to be able to control the X-axis motor, the Y-axis motor, the Z-axis motor, and the rotation motor. In other words, the core unit 90 is configured to be able to control movements of the movable frame 70 and the carriage 80. With such a configuration, the core unit 90 can cause the support arm 50 and the permanent robot hand 100 fixed to the support arm 50 to move in the X-, Y-, and Z-axis directions and rotate around the Z axis.

The core unit 90 having the above configuration is configured to control the permanent robot hand 100 and the extending robot hand 200 such that the permanent robot hand 100 and the extending robot hand 200 hold the workpiece W when the permanent robot hand 100 of the workpiece supply robot 10 reaches the workpiece W placed on a workpiece placement unit 30, which will be described later, of the workpiece placement platform 20 and a surface detection unit 170, which will be described later, of the permanent robot hand 100 detects contact between the permanent robot hand 100 and the workpiece W. Further, the core unit 90 is configured to control the movable frame 70 and the carriage 80 so as to transport the held workpiece W toward a transport destination such as a working machine.

Figure 5:
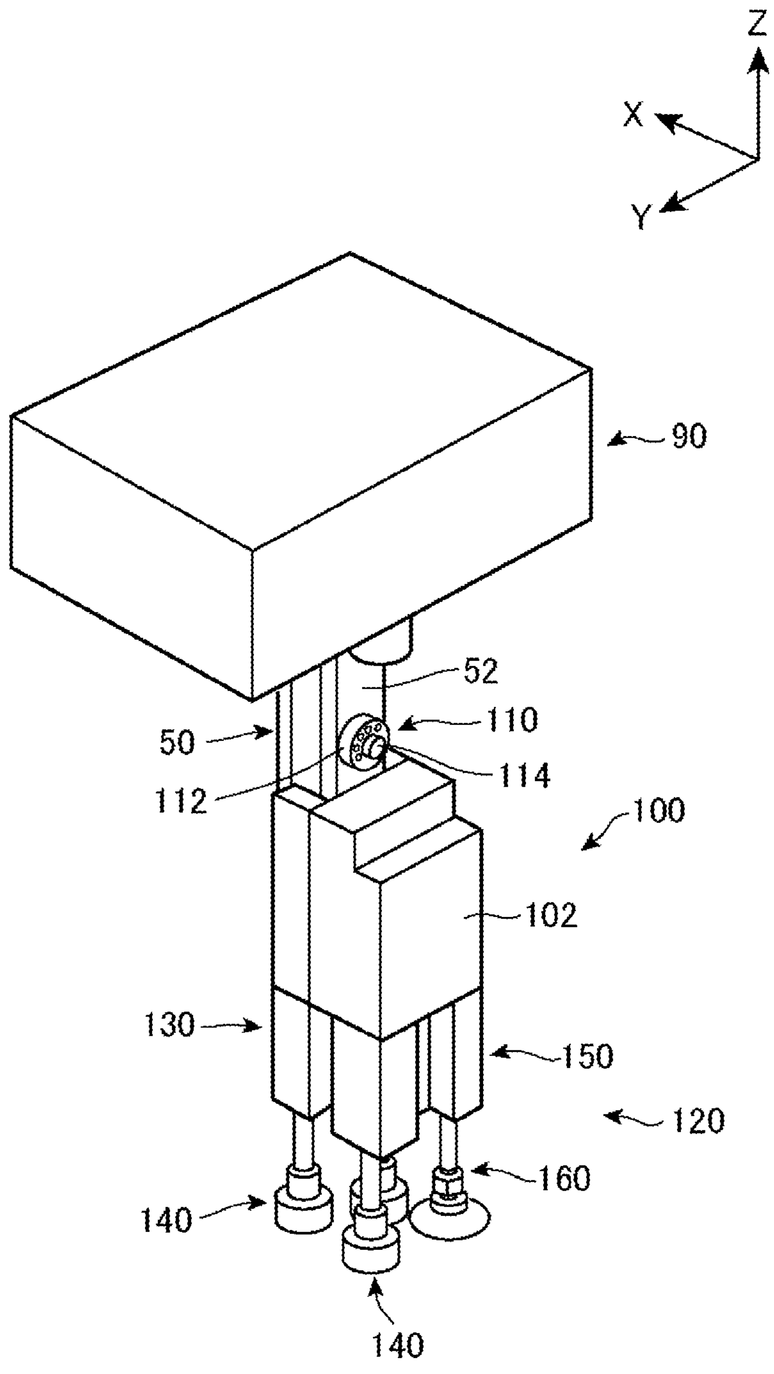
FIG. 5 is a schematic diagram showing a permanent robot hand of the present embodiment.

FIG. 5 is a schematic diagram showing the permanent robot hand of the present embodiment.

As shown in FIG. 5, the support arm 50 is provided in a hanging condition to the bottom part of the core unit 90 so as to be rotatable around the Z-axis. The permanent robot hand 100 is attached to a lower end of the support arm 50. Further, the support arm 50 includes a permanent side removable unit 110 from which the extending robot hand 200 is removable. Furthermore, the support arm 50 is formed in a rectangular shape. Inside the support arm 50, there is provided a space into which wiring for supplying electric power to the permanent robot hand 100 and the permanent side removable unit 110 and piping connected to an air suctioning source, which will be described later, can be inserted.

As shown in FIG. 5, the permanent side removable unit 110 includes a permanent side pedestal 112 formed in a columnar prism shape and a convex type connection unit 114 extending from a center of a surface of the permanent side pedestal 112. The permanent side removable unit 110 is provided on a side surface 52 of the support arm 50. The permanent side pedestal 112 includes a permanent side electric contact point (not shown) and a permanent side air supply port (not shown) on a peripheral part of the surface. The convex type connection unit 114 is configured to be able to engage with a concave type connection unit 244, which will be described later, of an extending side removable unit 240, which will be described later, of the extending robot hand 200.

With such a configuration, the permanent side removable unit 110 is configured to be able to be connected to the extending side removable unit 240, and to be able to supply the electric power to the extending robot hand 200 and supply air to the extending robot hand 200.

[Configuration of Permanent Robot Hand]

Figure 6:
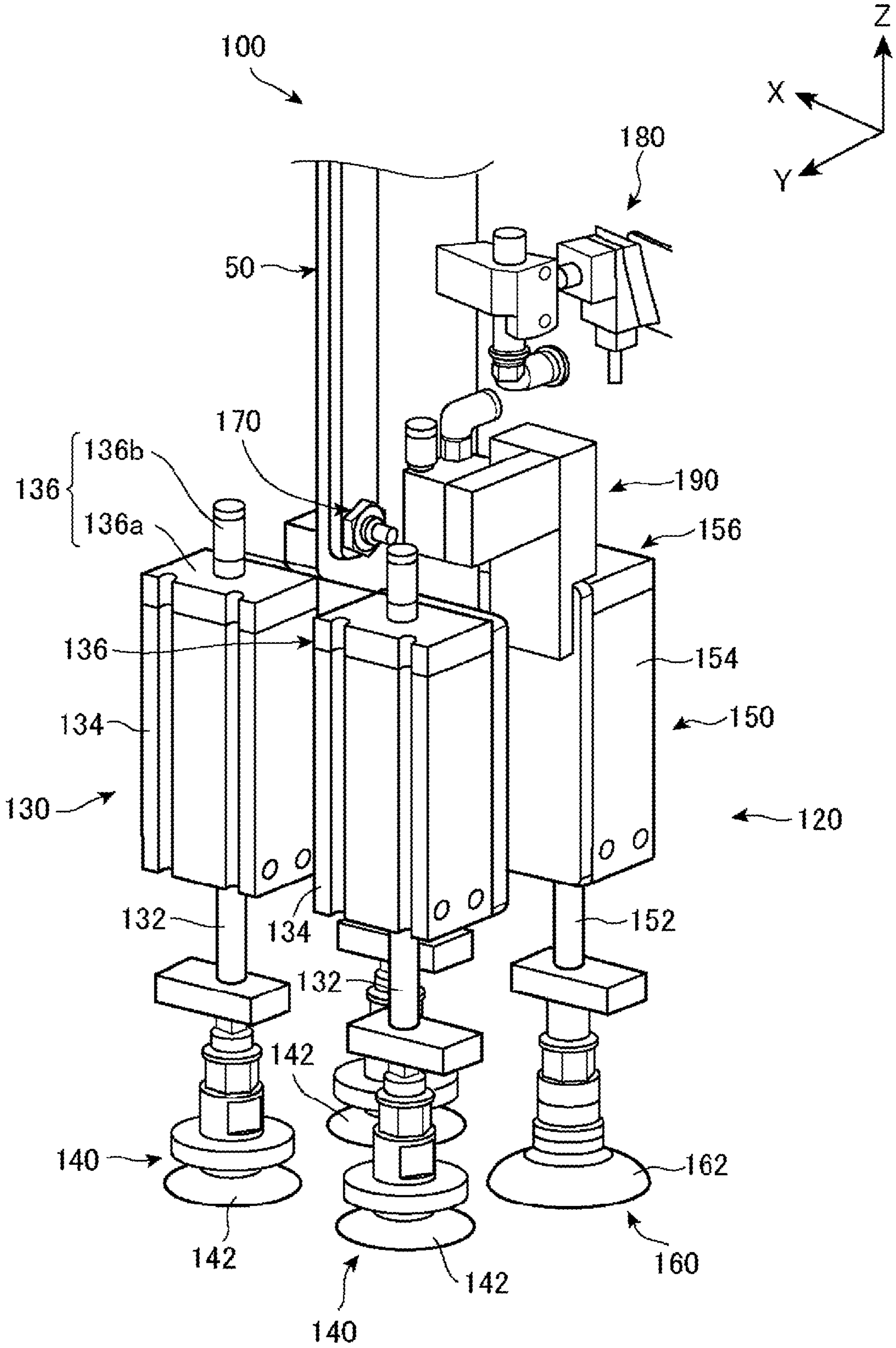
FIG. 6 is a schematic diagram showing the permanent robot hand of the present embodiment.

FIG. 6 is a schematic diagram showing the permanent robot hand of the present embodiment.

As shown in FIGS. 5 and 6, the permanent robot hand 100 includes a permanent hand unit 120 capable of holding the workpiece W, the surface detection unit 170, a material detection unit 180, a stroke control mechanism 190, and a permanent cover 102 that covers the surface detection unit 170, the material detection unit 180, and the stroke control mechanism 190.

As shown in FIGS. 5 and 6, the permanent hand unit 120 includes a plurality of (three in the present embodiment) air cylinders 130 and suction units 140 respectively attached to the air cylinders 130 and configured to be able to hold the workpiece W. Further, the permanent hand unit 120 includes an air cylinder for lifting-up 150 and a suction unit for lifting-up 160 attached to the air cylinder for lifting-up 150 and configured to be able to hold the workpiece W.

As shown in FIG. 6, the air cylinder 130 is a single-acting air cylinder that includes a piston (not shown), a piston rod 132, a cylinder tube 134, a head cover 136 attached to one end of the cylinder tube 134, a surface detection rod (not shown), and an air pressure supply port (not shown). The piston rod 132 is attached to one surface of the piston, and the surface detection rod is attached to a surface on an opposite side thereof. The piston is housed in the cylinder tube 134. The surface of the piston to which the surface detection rod is attached faces a side of the head cover 136 of the cylinder tube 134. The air pressure supply port is connected via a pipe to an air supplying source (not shown) that supplies the air.

The air cylinder 130 is configured such that a cylinder and the piston rod 132 are pushed out by supplying the air from the air pressure supply port into the cylinder tube 134. Further, the air cylinder 130 is configured such that the cylinder and the piston rod 132 are pulled in by exhausting the air from the air pressure supply port. Furthermore, the air cylinder 130 is configured to contract when the suction unit 140 is brought into contact with the surface of the workpiece W in a state in which the air is not supplied or exhausted. The head cover 136 includes a rectangular portion 136*a* and a cylindrical portion 136*b* that passes through a center of the rectangular portion 136*a*. The head cover 136 is configured such that a distal end of the surface detection rod is exposed from the cylindrical portion 136*b* when the air cylinder 130 contracts.

As shown in FIG. 6, the suction unit 140 is attached to a distal end of the piston rod 132 of the air cylinder 130. The suction unit 140 is connected via a pipe to the air suctioning source (not shown) that suctions the air. At a lower end thereof, the suction unit 140 includes a flat suction pad 142 that can suction (that can come into contact with) the surface of the workpiece W. The suction unit 140 is configured to suction the surface of the workpiece W placed on the workpiece placement platform 20 by a suction force of the air by the air suctioning source.

As shown in FIG. 6, the air cylinder for lifting-up 150 is a single-acting air cylinder that includes a piston for lifting-up (not shown), a piston rod for lifting-up 152, a cylinder tube for lifting-up 154, a head cover for lifting-up 156 attached to one end of the cylinder tube for lifting-up 154, a stroke control rod (not shown), and an air pressure supply port (not shown). The piston rod for lifting-up 152 is attached to one surface of the piston for lifting-up, and the stroke control rod is attached to a surface on an opposite side thereof. The piston for lifting-up is housed in the cylinder tube for lifting-up 154. The surface of the piston for lifting-up to which the stroke control rod is attached faces a side of the head cover for lifting-up 156 of the cylinder tube for lifting-up 154. The air pressure supply port for lifting-up is connected to the air supplying source via a pipe.

Figure 7:
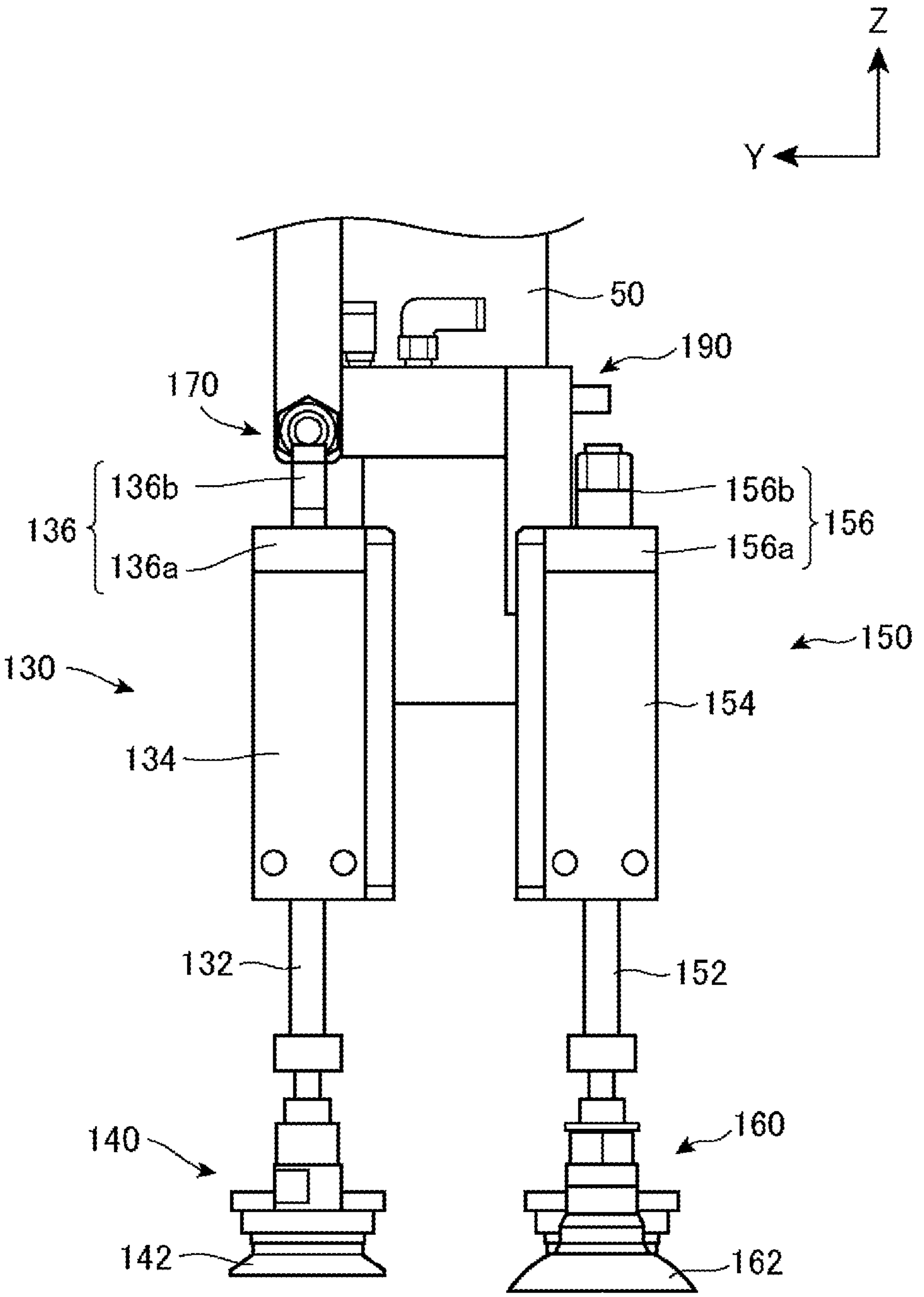
FIG. 7 is a side view showing the permanent robot hand of the present embodiment.

FIG. 7 is a side view showing the permanent robot hand of the present embodiment.

The air cylinder for lifting-up 150 is configured such that the cylinder for lifting-up and the piston rod for lifting-up 152 are pushed out by supplying the air from the air pressure supply port for lifting-up into the cylinder tube for lifting-up 154, and the cylinder for lifting-up and the piston rod for lifting-up 152 are pulled in by exhausting the air from the air pressure supply port for lifting-up. Further, the air cylinder for lifting-up 150 is configured to contract when the suction unit for lifting-up 160 is brought into contact with the surface of the workpiece W in the state in which the air is not supplied or exhausted. As shown in FIG. 7, the head cover for lifting-up 156 includes a rectangular portion 156*a* and a cylindrical portion 156*b* that passes through a center of the rectangular portion 156*a,* and configured such that a distal end of the stroke control rod is exposed from the cylindrical portion 156*b* when the air cylinder for lifting-up 150 contracts.

As shown in FIGS. 6 and 7, the suction unit for lifting-up 160 is attached to a distal end of the piston rod for lifting-up 152 of the air cylinder for lifting-up 150. The suction unit for lifting-up 160 is connected to the air suctioning source via a pipe. At a lower end thereof, the suction unit for lifting-up 160 includes a flat suction pad for lifting-up 162 that can suction (that can come into contact with) the surface of the workpiece W. The suction unit for lifting-up 160 is configured to suction the surface of the workpiece W placed on the workpiece placement platform 20 by the suction force of the air by the air suctioning source.

The suction pad for lifting-up 162 is a suction pad having a larger pad diameter than that of the suction pad 142. With such a configuration, the suction force thereof to the workpiece W is improved as compared to that of the suction pad 142, and a user can more easily identify the suction pad for lifting-up 162.

The surface detection unit 170 is configured to be able to detect the surface of the workpiece W. The surface detection unit 170 includes a surface detection sensor (not shown). As shown in FIGS. 6 and 7, the surface detection unit 170 is attached to an arbitrary position of the support arm 50. The surface detection sensor is configured to be able to detect that the suction pad 142 of the suction unit 140 has been brought into contact with the surface of the workpiece W. In the present specification, it is assumed that "brought into contact with the surface of the workpiece W" includes not only a case of being brought into complete contact with the surface of the workpiece W but also a case of being close enough to be evaluated as being brought into contact with the surface of the workpiece W.

Specifically, the surface detection sensor is a reflection type photoelectric sensor. The surface detection sensor is arranged at an upper part of the head cover 136 of the air cylinder 130. The surface detection sensor is attached in a direction intersecting the surface detection rod of the air cylinder 130. A beam emitted from a beam projecting element of the photoelectric sensor is reflected by the distal end of the surface detection rod of the air cylinder 130 exposed from the cylindrical portion 136*b* of the head cover 136 of the air cylinder 130, and the reflected beam is received by a beam receiving element of the photoelectric sensor, so that the surface detection unit sensor detects the contraction of the air cylinder 130.

The surface detection unit 170 having the above configuration is configured to detect the surface of the workpiece W when the surface detection sensor detects the contraction of the air cylinder 130. It should be noted that the surface detection unit 170 is not limited to the configuration described above, and a variety of publicly known configurations can be arbitrarily adopted including contact type sensors such as a photoreflector, a proximity sensor, and a force sensor as long as it is configured to be able to detect the surface of the workpiece W.

The material detection unit 180 is configured to be able to detect whether or not the workpiece W is placed on the workpiece placement platform 20. Specifically, as shown in FIG. 6, the material detection unit 180 is attached to the support arm 50 and includes a pressure sensor (not shown). The pressure sensor is connected to the air suctioning source and the suction unit 140 by pipes, respectively, and is configured to be able to detect that the suction pad 142 of the suction unit 140 has suctioned the workpiece W.

With such a configuration, the material detection unit 180 detects that the pressure sensor is in a vacuum state when the suction unit 140 suctions the workpiece W on the workpiece placement platform, thereby detecting that the workpiece W is placed on the workpiece placement platform. Further, since the suction unit 140 does not suction a surface of the workpiece placement platform 20, the material detection unit 180 does not erroneously detect the workpiece placement platform 20 as the workpiece W when the workpiece W is not placed on the workpiece placement platform 20.

The stroke control mechanism 190 includes a piston (not shown) and a stopper pin (not shown) that is pushed out by the piston. As shown in FIGS. 6 and 7, the stroke control mechanism 190 is arranged at an upper part of the head cover for lifting-up 156 of the air cylinder for lifting-up 150. The stroke control mechanism 190 is attached such that the stopper pin protrudes from a direction intersecting with the stroke control rod of the air cylinder for lifting-up 150. In the stroke control mechanism 190, the piston expands and contracts in accordance with expansion and contraction of the air cylinder for lifting-up 150 so that the stopper pin moves. Specifically, in the stroke control mechanism 190, when the air cylinder for lifting-up 150 expands, the piston contracts and the stopper pin is pulled in. Further, in the stroke control mechanism 190, when the air cylinder for lifting-up 150 contracts, the piston expands and the stopper pin is pushed out.

The stroke control mechanism 190 having the above configuration is configured such that the stopper pin interferes with the distal end of the stroke control rod of the air cylinder for lifting-up 150 exposed from the cylindrical portion 156*b* of the head cover for lifting-up 156 of the air cylinder for lifting-up 150 so as to limit a stroke of the air cylinder for lifting-up 150 when the air cylinder for lifting-up 150 contracts, that is, when the workpiece W is lifted up. With such a configuration, it is possible to prevent the workpiece W from being deformed due to excessive stroke of the air cylinder for lifting-up 150 when the workpiece W made of a thin plate material is lifted up.

The permanent robot hand 100 having the above configuration is configured to lift up one end of the uppermost workpiece W from among a plurality of the workpieces W stacked on the workpiece placement platform 20. Specifically, in a state in which the air cylinder 130 is expanded to the maximum, the permanent robot hand 100 causes the suction unit 140 and the suction unit for lifting-up 160 to suction the stacked workpiece W and contract the air cylinder for lifting-up 150, thereby lifting up the uppermost workpiece W.

[Configuration of Extending Robot Hand]

Figure 8:
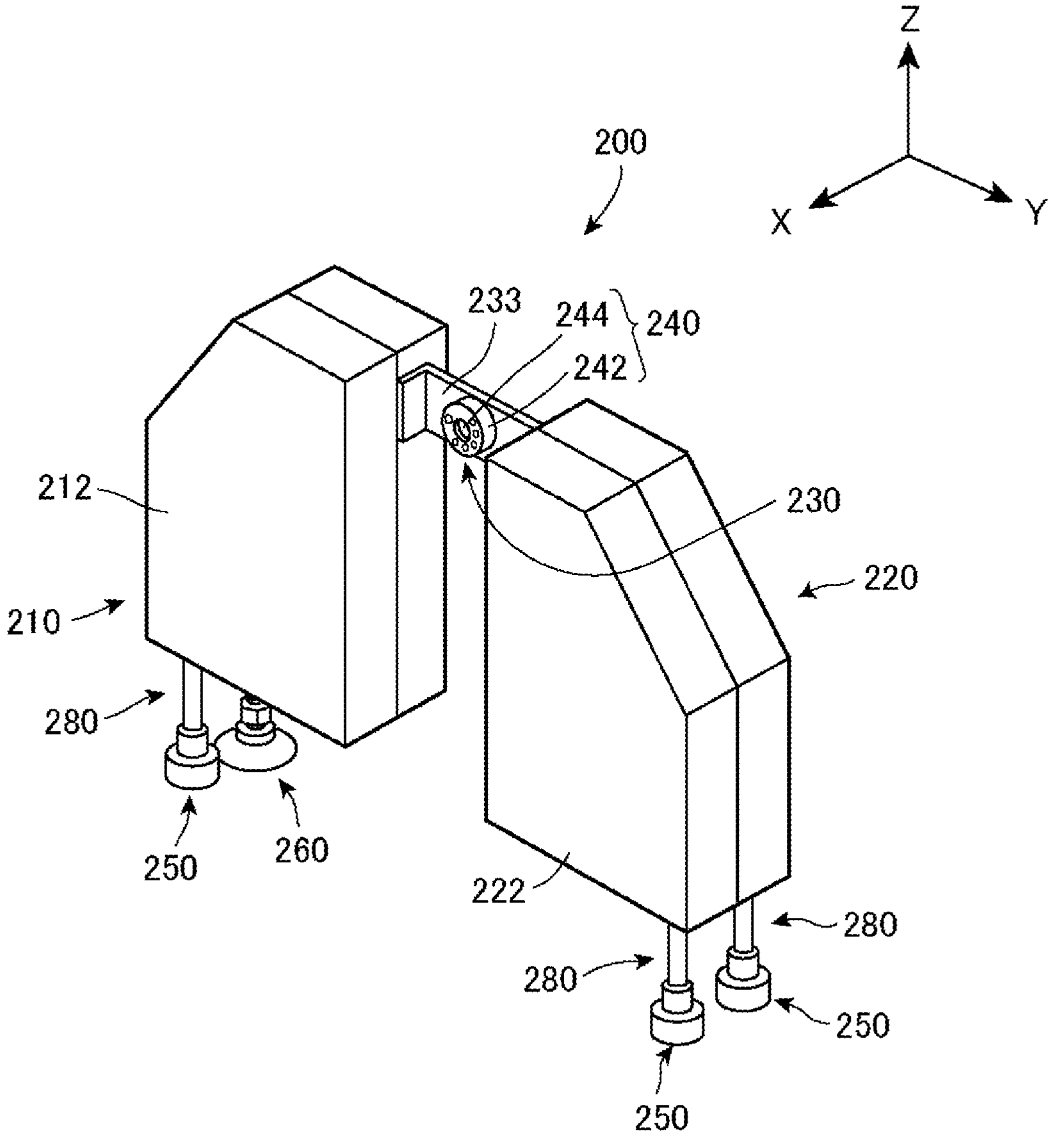
FIG. 8 is a schematic diagram showing an extending robot hand of the present embodiment.

FIG. 8 is a schematic diagram showing the extending robot hand of the present embodiment.

As shown in FIGS. 2 and 3, the extending robot hand 200 includes a first extending hand unit 210 and a second extending hand unit 220 that are opposed to each other with the permanent robot hand 100 therebetween, and a connection unit 230 that connects the first extending hand unit 210 and the second extending hand unit 220. Further, as shown in FIG. 8, the extending robot hand 200 includes the extending side removable unit 240 capable of being connected to the permanent side removable unit 110. The extending side removable unit 240 is provided to the connection unit 230. The extending robot hand 200 is arranged substantially in a bilaterally symmetrical manner with the extending side removable unit 240 as the center.

As shown in FIG. 8, the extending side removable unit 240 includes an extending side pedestal 242 formed in a columnar prism shape and a concave type connection unit 244 provided in a center of a surface of the extending side pedestal 242. The extending side pedestal 242 includes an extending side electric contact point (not shown) and an extending side air supply port (not shown) on a peripheral part of the surface, at positions respectively corresponding to the permanent side electric contact point and the permanent side air supply port of the permanent side removable unit 110 of the support arm 50. The concave type connection unit 244 is configured to be able to engage with the convex type connection unit 114 of the permanent side removable unit 110 of the support arm 50.

In the extending side removable unit 240 having such a configuration, the extending side pedestal 242 is attached to a surface 233, which will be described later, of the connection unit 230, and is configured to be connected to the permanent side removable unit 110 from a horizontal direction. With such a configuration, the extending robot hand 200 is configured such that the electric power and the air from the permanent robot hand 100 are supplied via the extending side removable unit 240.

Figure 9:
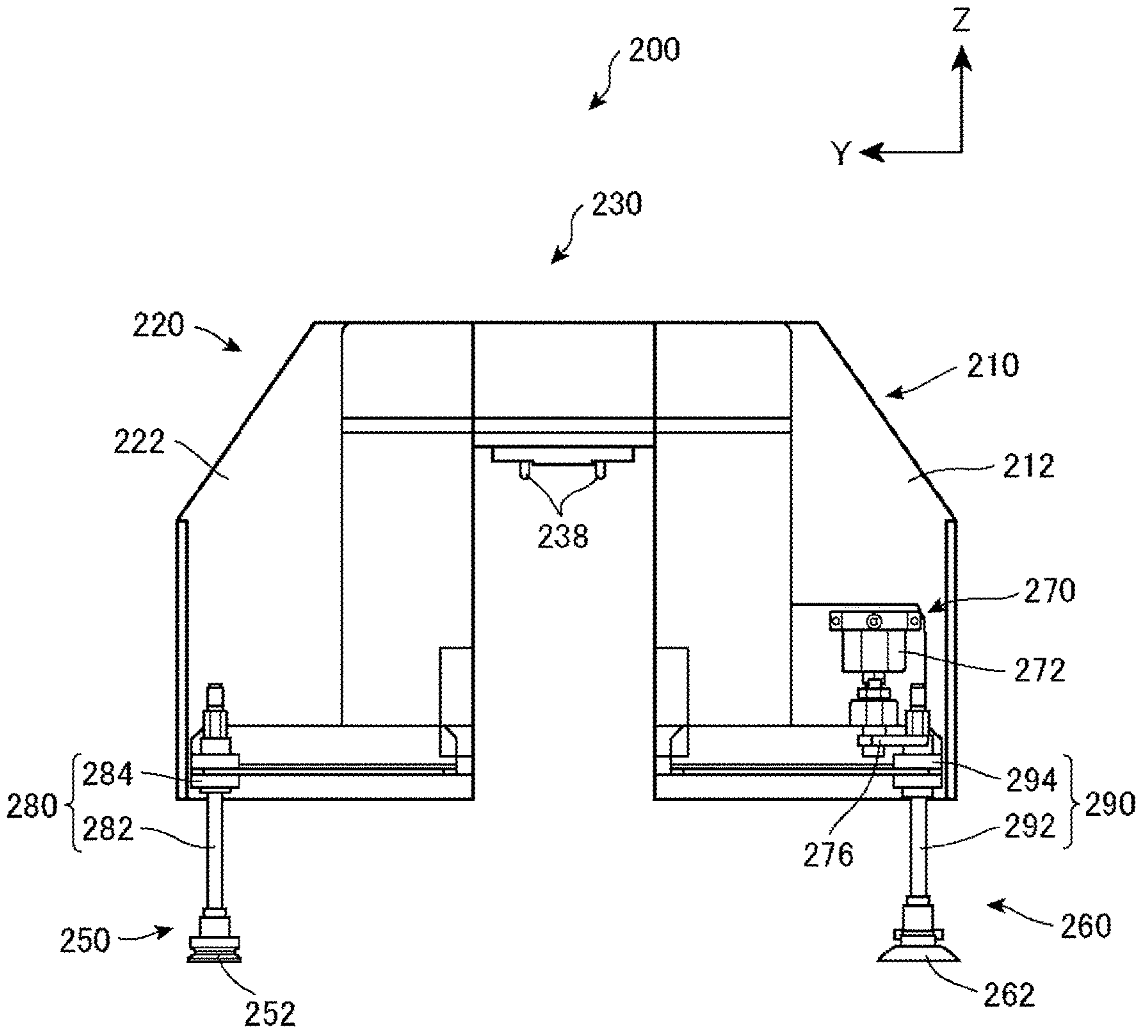
FIG. 9 is a cross-sectional view showing the extending robot hand of the present embodiment.

FIG. 9 is a cross-sectional view showing the extending robot hand of the present embodiment.

As shown in FIGS. 8 and 9, the first extending hand unit 210 includes a spring-loaded shaft 280, a spring-loaded shaft for lifting-up 290, a suction unit 250, a suction unit for lifting-up 260, a buffer mechanism 270, and a first extending hand cover 212. The second extending hand unit 220 includes a plurality of (two in the present embodiment) the spring-loaded shafts 280, the suction units 250, and a second extending hand cover 222.

As shown in FIG. 9, the spring-loaded shaft 280 and the spring-loaded shaft for lifting-up 290 respectively include shaft units 282 and 292 and spring units 284 and 294, which are respectively provided to the shaft units 282 and 292. The spring units 284 are attached to the first extending hand cover 212 and the second extending hand cover 222 and the spring unit 294 is attached to the first extending hand cover 212. The shaft units 282 and 292 are configured to be able to expand and contract with respect to the first extending hand cover 212 and the second extending hand cover 222, respectively.

Further, the suction unit 250 is attached to a distal end of the shaft unit 282 of the spring-loaded shaft 280. The suction unit for lifting-up 260 is attached to a distal end of the shaft unit 292 of the spring-loaded shaft for lifting-up 290. The spring-loaded shaft 280 and the spring-loaded shaft for lifting-up 290 having the above configuration are configured to contract when the suction unit 250 and the suction unit for lifting-up 260 come into contact with the surface of the workpiece W, respectively. Further, the spring-loaded shaft 280 and the spring-loaded shaft for lifting-up 290 are configured to expand when the suction unit 250 and the suction unit for lifting-up 260 are separated from the surface of the workpiece W, respectively.

As shown in FIG. 9, the suction unit 250 is attached to the distal end of the shaft unit 282 of the spring-loaded shaft 280. The suction unit 250 is connected to the extending side air supply port of the extending side removable unit 240 via a pipe. At a lower end thereof, the suction unit 250 includes a flat suction pad 252 that can suction (that can come into contact with) the surface of the workpiece W. The suction unit 250 is configured to suction the surface of the workpiece W placed on the workpiece placement platform 20 by the suction force of the air by the air suctioning source. It should be noted that in the present embodiment, the suction pad 252 is a suction pad similar to the suction pad 142 of the suction unit 140 of the permanent hand unit 120 of the permanent robot hand 100, but is not limited to this. Other suction pads may be used.

As shown in FIG. 9, the suction unit for lifting-up 260 is attached to the distal end of the shaft unit 292 of the spring-loaded shaft for lifting-up 290. The suction unit for lifting-up 260 is connected to the extending side air supply port of the extending side removable unit 240 via a pipe. At a lower end thereof, the suction unit for lifting-up 260 includes a flat suction pad for lifting-up 262 that can suction (that can come into contact with) the surface of the workpiece W. The suction unit for lifting-up 260 is configured to suction the surface of the workpiece W placed on the workpiece placement platform 20 by the suction force of the air by the air suctioning source. It should be noted that in the present embodiment, the suction pad for lifting-up 262 is a suction pad similar to the suction pad for lifting-up 162 of the suction unit for lifting-up 160 of the permanent hand unit 120 of the permanent robot hand 100, but is not limited to this. Other suction pads may be used.

As shown in FIG. 9, the buffer mechanism 270 includes a buffer air cylinder 272 and a connection fitting 276. The buffer air cylinder 272 is a single-acting air cylinder that includes a buffer piston (not shown), a buffer piston rod (not shown) attached to the buffer piston, a buffer cylinder tube (not shown), a buffer head cover (not shown) attached to one end of the buffer cylinder tube, and a buffer air pressure supply port (not shown). A distal end of the buffer piston rod is attached to one end of the connection fitting 276. The buffer air pressure supply port is connected to the extending side air supply port of the extending side removable unit 240 via a pipe.

The buffer air cylinder 272 is configured such that the buffer cylinder and the buffer piston rod is pushed out by supplying the air from the buffer air pressure supply port into the buffer cylinder tube. Further, the buffer air cylinder 272 is configured such that the buffer cylinder and the buffer piston rod are pulled in by exhausting the air from the buffer air pressure supply port. One end of the connection fitting 276 is connected to the buffer piston rod, and the other end thereof is connected to the shaft unit 292 of the spring-loaded shaft for lifting-up 290.

With such a configuration, the buffer mechanism 270 can cause the spring-loaded shaft for lifting-up 290 to expand by pushing out the buffer piston rod of the buffer air cylinder 272. Further, the buffer mechanism 270 can cause the spring-loaded shaft for lifting-up 290 to contract by pulling in the buffer piston rod of the buffer air cylinder 272.

Figure 10:
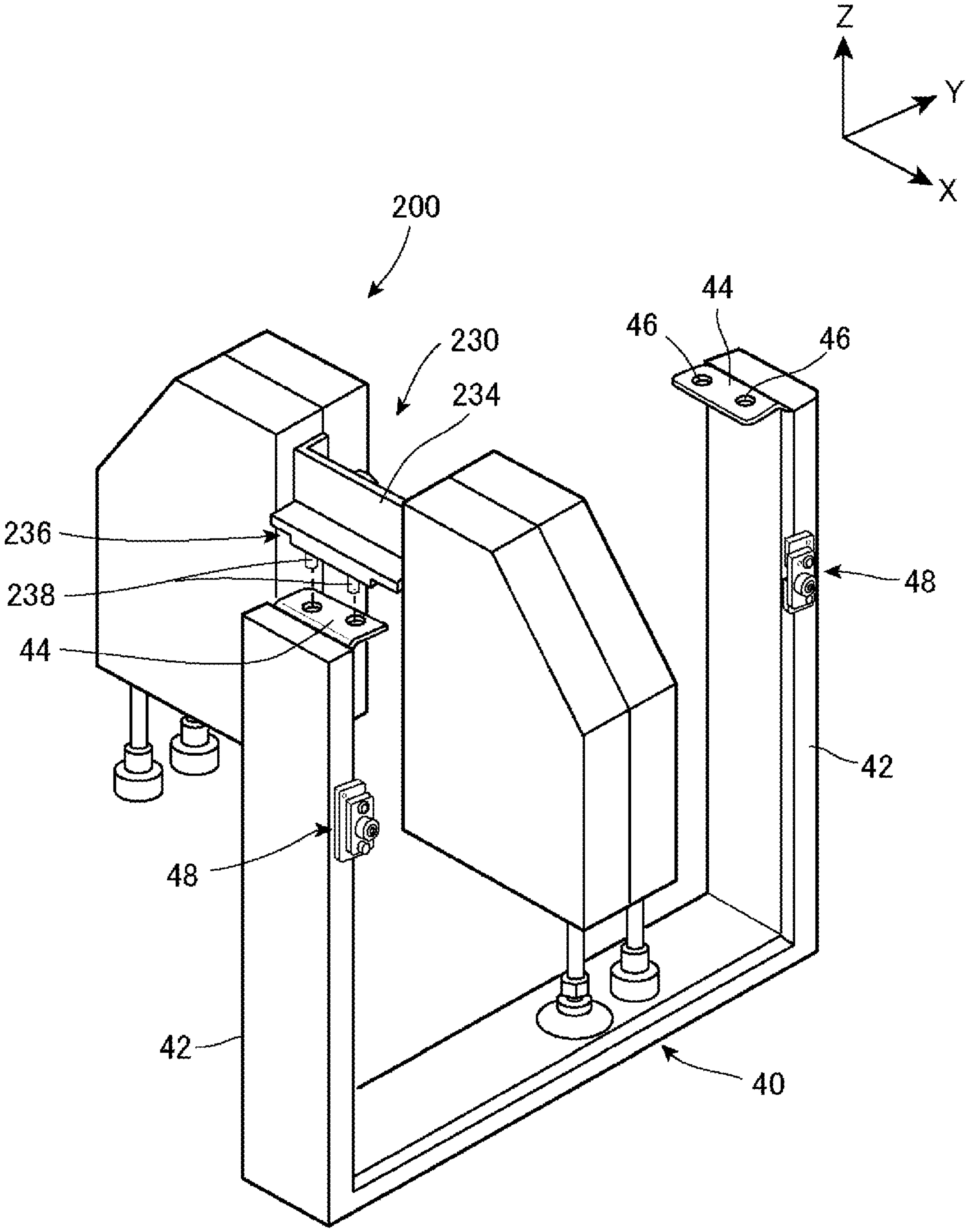
FIG. 10 is a schematic diagram showing a storage unit of the present embodiment.

FIG. 10 is a schematic diagram showing the storage unit of the present embodiment.

As shown in FIG. 3, the connection unit 230 includes a base unit 232 in a rectangular shape and a hanging unit 236. One end of the base unit 232 is connected to the first extending hand unit 210. The other end of the base unit 232 is connected to the second extending hand unit 220. As shown in FIG. 8, the extending side removable unit 240 is attached to a center of the surface 233 of the base unit 232. As shown in FIG. 10, the hanging unit 236 extends from a rear surface 234 of the base unit 232 so as to be orthogonal to the base unit 232. A positioning pin 238 is provided to the hanging unit 236. The connection unit 230 having such a configuration is configured to be able to be hanged from the storage unit 40 of the workpiece placement platform 20.

The extending robot hand 200 having the above configuration is configured to lift up one end of the uppermost workpiece W from among the plurality of the workpieces W stacked on the workpiece placement platform 20. Specifically, the extending robot hand 200 is configured to lift up the one end of the uppermost workpiece W by causing the respective suction units of the permanent robot hand 100 and the extending robot hand 200 to suction the stacked workpiece in a state in which the air cylinder 130 and the air cylinder for lifting-up 150 of the permanent robot hand 100 are expanded to the maximum, and by contracting the buffer air cylinder 272 of the first extending hand unit 210 after that.

It should be noted that the extending robot hand 200 is not limited to the configuration described above, and various arbitrary shapes and configurations can be adopted. Further, various types of the extending robot hands 200 can be installed to and removed from the workpiece supply robot 10.

The workpiece supply robot 10 having the above configuration is configured to be able to hold the workpiece W stacked on the workpiece placement platform 20 by the permanent robot hand 100 and the extending robot hand 200 and supply the held workpiece W to the working machine or the like. Further, depending on a size, a shape, a holding position, and the like of the workpiece W to be held, the workpiece supply robot 10 can hold the workpiece W only with the permanent robot hand 100 or can hold the workpiece W by installing various types of the extending robot hands 200.

Furthermore, the workpiece supply robot 10 is configured such that the respective air cylinders of the permanent robot hand 100 and the respective spring-loaded shafts of the extending robot hand 200 independently expand and contract. With such a configuration, even when the workpiece W is stacked with an inclination, the workpiece W can be held as the respective air cylinders and the respective spring-loaded shafts expand and contract in accordance with the inclination.

[Configuration of Workpiece Placement Platform]

Next, details of each component of the workpiece placement platform 20 will be described.

As shown in FIG. 1, the workpiece placement platform 20 includes a plurality of (two in the present embodiment) the workpiece placement units 30. Further, the workpiece placement platform 20 includes the storage unit 40 arranged in a gap between the plurality of the workpiece placement units 30. It should be noted that since various publicly known configurations can be adopted to the workpiece placement unit 30, detailed description thereof will be omitted.

As shown in FIGS. 1 and 10, the storage unit 40 includes a support column 42 that extends in a direction intersecting with the workpiece placement platform 20, and a hanging unit 44 that extends in a direction intersecting with an extending direction of the support column 42. In the present embodiment, the storage unit 40 includes two sets of the support column 42 and the hanging unit 44, but the present invention is not limited to this. One set of the support column 42 and the hanging unit 44 may be provided, or three or more sets may be provided.

Figure 11:
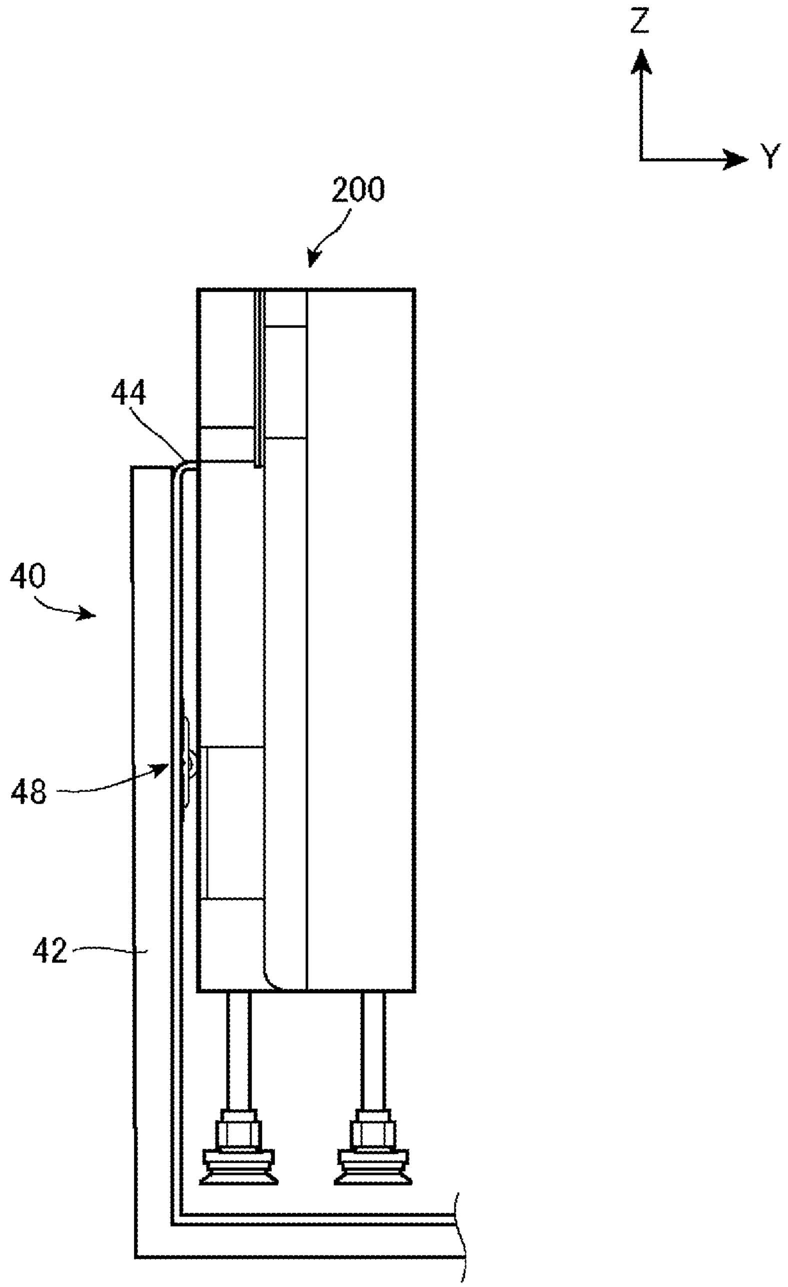
FIG. 11 is a side view showing the storage unit of the present embodiment.

FIG. 11 is a side view showing the storage unit of the present embodiment.

As shown in FIGS. 10 and 11, the hanging unit 44 is configured to be able to install and remove the extending robot hand 200 of the workpiece supply robot 10. Specifically, the hanging unit 44 incudes a positioning hole 46. The hanging unit 44 is configured to be able to hang the connection unit 230 of the extending robot hand 200 by inserting the positioning pin 238 of the hanging unit 236 of the connection unit 230 of the extending robot hand 200 into the positioning hole 46.

The two support columns 42 are provided so as to be spaced apart by a distance that allows the permanent robot hand 100 of the workpiece supply robot 10 to pass between the support columns 42 in a state in which the extending robot hand 200 of the workpiece supply robot 10 is hanged from the hanging unit 44.

As shown in FIGS. 10 and 11, the storage unit 40 further includes a guide roller 48 attached to a side surface of the support column 42. With such a configuration, the storage unit 40 makes it easy to install and remove the extending robot hand 200 and makes it possible to hang the extending robot hand 200 perpendicularly to the workpiece placement platform 20.

The storage unit 40 having the above configuration can hold the extending robot hand 200 such that a longitudinal direction of the extending robot hand 200 is aligned with a width direction of the workpiece placement platform 20. Thereby, the storage unit 40 can store the extending robot hand 200 in a limited space between the workpiece placement units 30.

Method of Installing and Removing Extending Robot Hand According to Present Embodiment Next, a method of installing and removing the extending robot hand 200 of the workpiece supply robot 10 in the workpiece supply system 1 according to the present embodiment will be described. It should be noted that in the following description, it is assumed that the movement of the workpiece supply robot 10 is controlled by the core unit 90 of the workpiece supply robot 10 unless otherwise specified.

Figure 12:
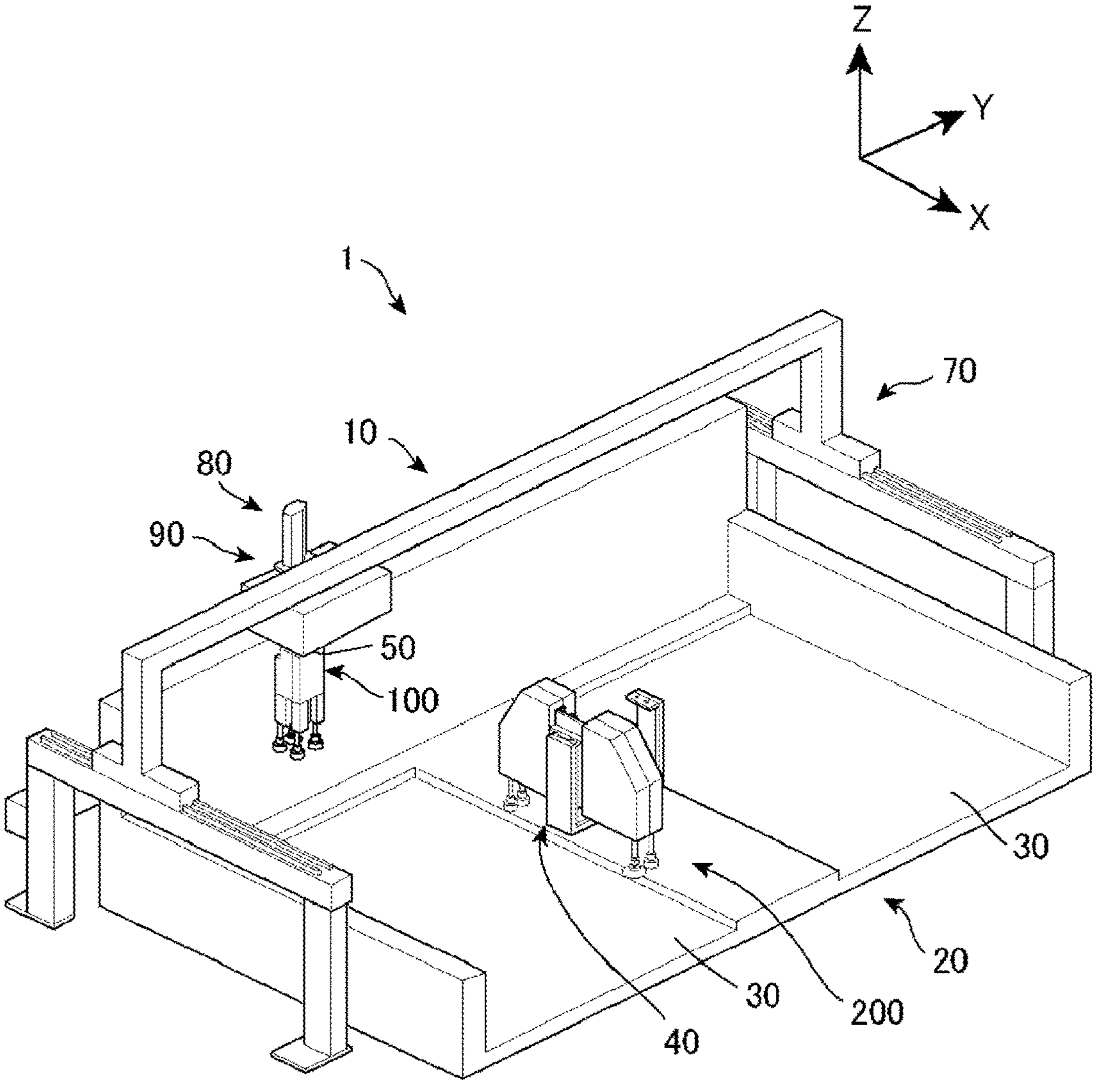
FIG. 12 is a schematic diagram showing the workpiece supply system of the present embodiment.

FIG. 12 is a schematic diagram showing the workpiece supply system of the present embodiment.

First, in the workpiece supply robot 10, the carriage 80 moves in the Y-axis direction from a state shown in FIG. 12 so as to carry the support arm 50 and the permanent robot hand 100 to the gap between the two workpiece placement units 30 of the workpiece placement platform 20. After the movement of the carriage 80, the support arm 50 and the permanent robot hand 100 rotate around the Z-axis such that the permanent side removable unit 110 provided to the support arm 50 is opposed to the extending side removable unit 240 of the extending robot hand 200 stored in the storage unit 40 of the workpiece placement platform 20.

Subsequently, in the workpiece supply robot 10, the movable frame 70 moves in the X-axis direction so as to carry the support arm 50 and the permanent robot hand 100 to a front of the extending robot hand 200 stored in the storage unit 40 of the workpiece placement platform 20. After that, the workpiece supply robot 10 moves the carriage 80 in the Y-axis direction and the Z-axis direction, thereby connecting the permanent side removable unit 110 provided to the support arm 50 to the extending side removable unit 240 of the extending robot hand 200. The extending robot hand 200 is installed to the support arm 50 when the permanent side removable unit 110 and the extending side removable unit 240 are connected.

After that, the carriage 80 of the workpiece supply robot 10 rises in the Z-axis direction, thereby the positioning pin 238 of the hanging unit 236 of the connection unit 230 of the extending robot hand 200, which is inserted into the positioning hole 46 of the hanging unit 44 of the storage unit 40 of the workpiece placement platform 20, is pulled out. After the positioning pin 238 is pulled out, in the workpiece supply robot 10, the movable frame 70 moves in the X-axis direction again so that the support arm 50, the permanent robot hand 100, and the extending robot hand 200 are carried from the storage unit 40. By the above steps, an installing operation of the extending robot hand 200 of the workpiece supply robot 10 in the workpiece supply system 1 is executed. Further, when the extending robot hand 200 is removed, a removing operation is executed in a reverse order of the steps described above.

Advantages of Workpiece Supply Robot and Workpiece Supply System According to Present Embodiment As described above, the workpiece supply robot 10 according to the present embodiment is configured to be able to transport the workpiece W placed on the workpiece placement platform 20 from the workpiece placement platform 20, and includes the support arm 50, the permanent robot hand 100 fixedly provided to the support arm 50 and configured to hold the workpiece W, and the extending robot hand 200 configured to hold the workpiece W together with the permanent robot hand 100, in which the extending robot hand 200 is configured to be removable.

Then, by including the extending robot hand 200 configured to be removable in such a manner, the workpiece supply robot 10 according to the present embodiment has an advantage that the robot hand can be partially extended without being subject to a restriction due to a common configuration of the robot hands. Further, the workpiece supply robot 10 has an advantage that the extending part can be arbitrarily changed to suit the workpiece W.

Further, in the workpiece supply robot 10 according to the present embodiment, the support arm 50 includes the permanent side removable unit 110 from which the extending robot hand 200 is removable, the extending robot hand 200 includes the extending side removable unit 240 capable of being connected to the permanent side removable unit 110, and the electric power is supplied from the permanent robot hand 100 via the extending side removable unit 240. With such a configuration, the workpiece supply robot 10 connects the extending robot hand 200 only with the extending side removable unit 240 so as to supply the electric power. Therefore, it is not necessary to connect extra wiring. As a result, the workpiece supply robot 10 has an advantage that a downtime resulting from installation and removal of the extending robot hand 200 can be shortened.

Furthermore, in the workpiece supply robot 10 according to the present embodiment, the permanent side removable unit 110 is provided to the side surface 52 of the support arm 50 and the extending side removable unit 240 is configured to be connected to the permanent side removable unit 110 from the horizontal direction. With such a configuration, in the workpiece supply robot 10, the permanent side removable unit 110 and the extending side removable unit 240 are less likely to collect dust, which improves robustness of the permanent side removable unit 110 and the extending side removable unit 240. As a result, the workpiece supply robot 10 has an advantage that trouble resulting from the installation and removal of the extending robot hand 200 can be reduced.

Further, in the workpiece supply robot 10 according to the present embodiment, the extending robot hand 200 further includes the first extending hand unit 210 and the second extending hand unit 220 that are opposed to each other with the permanent robot hand 100 therebetween and the connection unit 230 configured to connect the first extending hand unit 210 and the second extending hand unit 220, and the extending side removable unit 240 is provided to the connection unit 230. With such a configuration, the workpiece supply robot 10 has an advantage that the robot hand can be extended to the left and right of the permanent robot hand 100 with one removable unit.

Furthermore, in the workpiece supply robot 10 according to the present embodiment, the extending robot hand 200 is arranged substantially in a bilaterally symmetrical manner with the extending side removable unit 240 as the center. With such a configuration, the workpiece supply robot 10 has an advantage that the robot hand can be extended in a bilaterally symmetrical manner and the holding position of the workpiece W is not restricted by the arrangement of the extending robot hand 200.

Further, in the workpiece supply robot 10 according to the present embodiment, the permanent robot hand 100 includes the surface detection unit 170, and the surface detection unit 170 is configured to be able to detect the surface of the workpiece W. With such a configuration, the workpiece supply robot 10 has an advantage that the surface of the workpiece W can be detected regardless of whether or not the extending robot hand 200 is installed. Further, in the workpiece supply robot 10, it is possible to reduce a cost by mounting the surface detection unit 170 on the permanent robot hand 100 and keeping a function of the extending robot hand 200 side at a minimum necessary level.

Furthermore, in the workpiece supply robot 10 according to the present embodiment, the permanent robot hand 100 includes the material detection unit 180, and the material detection unit 180 is configured to be able to detect whether or not the workpiece W is placed on the workpiece placement platform 20. With such a configuration, the workpiece supply robot 10 has an advantage that whether or not the workpiece W is placed on the workpiece placement platform can be detected regardless of whether or not the extending robot hand 200 is installed. Further, in the workpiece supply robot 10, it is possible to reduce the cost by mounting the material detection unit 180 on the permanent robot hand 100 and keeping the function of the extending robot hand 200 side at the minimum necessary level.

Further, in the workpiece supply robot 10 according to the present embodiment, the permanent robot hand 100 is configured to lift up the one end of the uppermost workpiece W from among the plurality of the workpieces W stacked on the workpiece placement platform 20. With such a configuration, the workpiece supply robot 10 has an advantage that the one end of the uppermost workpiece W can be lifted up regardless of whether or not the extending robot hand 200 is installed.

Furthermore, in the workpiece supply robot 10 according to the present embodiment, the extending robot hand 200 is configured to lift up the one end of the uppermost workpiece W from among the plurality of the workpieces W stacked on the workpiece placement platform 20. With such a configuration, the workpiece supply robot 10 has an advantage that an end of the large workpiece W can be lifted up when the extending robot hand 200 is installed to hold the large workpiece W.

The workpiece supply system 1 according to the present embodiment includes the workpiece supply robot 10 described above and the workpiece placement platform 20, and the workpiece placement platform 20 includes the storage unit 40 for storing the extending robot hand 200. With such a configuration, the workpiece supply robot 10 has an advantage that there is no need to make a movable range of the workpiece supply robot 10 larger than that of a conventional one because it is possible to install and remove the extending robot hand 200 on the workpiece placement platform 20. Further, the workpiece supply robot 10 has an advantage that the extending robot hand 200 can be installed and removed in a working space that is not different from the conventional one.

Further, in the workpiece supply system 1 according to the present embodiment, the workpiece placement platform 20 includes the plurality of the workpiece placement units 30, and the storage unit 40 is arranged in the gap between the plurality of the workpiece placement units 30. With such a configuration, the workpiece supply robot 10 has an advantage that the workpiece placement platform 20 can be prevented from becoming large.

Furthermore, in the workpiece supply system 1 according to the present embodiment, the storage unit 40 includes the support column 42 that extends in the direction intersecting with the workpiece placement platform 20 and the hanging unit 44 that extends in the direction intersecting with the extending direction of the support column 42. With such a configuration, the workpiece supply robot 10 has an advantage that the storage unit 40 can be made smaller as it is possible to hang the extending robot hand 200 for storage.

Further, in the workpiece supply system 1 according to the present embodiment, the hanging unit 44 is configured to be able to hang the connection unit 230 of the extending robot hand 200. With such a configuration, the workpiece supply robot 10 has an advantage that it is possible to store the extending robot hand 200 in a simple configuration and that it takes less time to install and remove the extending robot hand 200 to and from the storage unit 40 because the extending robot hand 200 is hanged only by the connection unit 230.

Modified Examples

Although the preferred embodiment of the present invention has been described above, the technical scope of the present invention is not limited to the scope described in the embodiment described above. Various modifications or improvements can be added to the embodiment described above.

For example, in the embodiment described above, it has been described that the support arm 50 includes the permanent side removable unit 110 from which the extending robot hand 200 is removable, the extending robot hand 200 includes the extending side removable unit 240 capable of being connected to the permanent side removable unit 110, and the electric power is supplied from the permanent robot hand 100 via the extending side removable unit 240. However, the present invention is not limited to this. Various arbitrary configurations can be adopted as long as the extending robot hand 200 is configured to be removable. Further, the extending robot hand 200 may be configured to be removable between the support arm 50 and the permanent robot hand 100. Furthermore, the extending robot hand 200 may be configured to be removable from the permanent robot hand 100. Further, the extending robot hand 200 may be configured to be removable from the core unit 90.

In the embodiment described above, it has been described that the permanent side removable unit 110 is provided to the side surface 52 of the support arm 50 and the extending side removable unit 240 is connected to the permanent side removable unit 110 from the horizontal direction. However, the present invention is not limited to this. For example, the permanent side removable unit 110 may be provided on a bottom surface of the support arm 50. Further, the extending side removable unit 240 may be configured to be connected to the permanent side removable unit 110 from the vertical direction.

In the embodiment described above, it has been described that the extending robot hand 200 further includes the first extending hand unit 210 and the second extending hand unit 220, which are opposed to each other with the permanent robot hand 100 therebetween, and the connection unit 230 configured to connect the first extending hand unit 210 and the second extending hand unit 220, and the extending side removable unit 240 is provided to the connection unit 230. However, the present invention is not limited to this. For example, various arbitrary configurations can be adopted such as the one in which the extending robot hand 200 includes one extending hand unit and the extending side removable unit 240 is provided to the extending hand unit.

In the embodiment described above, the extending robot hand 200 has been described as the one being arranged substantially in a bilaterally symmetrical manner with the extending side removable unit 240 as the center. However, the present invention is not limited to this. For example, the extending robot hand 200 may be arranged in a bilaterally asymmetrical manner with respect to the extending side removable unit 240.

In the embodiment described above, it has been described that the permanent robot hand 100 includes the surface detection unit 170 and the surface detection unit 170 is configured to be able to detect the surface of the workpiece W. However, the present invention is not limited to this. The permanent robot hand 100 may not include the surface detection unit 170.

In the embodiment described above, it has been described that the permanent robot hand 100 includes the material detection unit 180 and the material detection unit 180 is configured to be able to detect whether or not the workpiece W is placed on the workpiece placement platform 20. However, the present invention is not limited to this. The permanent robot hand 100 may not include the material detection unit 180.

In the embodiment described above, it has been described that the permanent robot hand 100 is configured to lift up the one end of the uppermost workpiece W from among the plurality of the workpieces W stacked on the workpiece placement platform 20. However, the present invention is not limited to this. The permanent robot hand 100 may not be configured to lift up the one end of the uppermost workpiece W from among the plurality of the workpieces W stacked on the workpiece placement platform 20.

In the embodiment described above, the extending robot hand 200 has been described as the one configured to lift up the one end of the uppermost workpiece W from among the plurality of the workpieces W stacked on the workpiece placement platform 20. However, the present invention is not limited to this. The extending robot hand 200 may not be configured to lift up the one end of the uppermost workpiece W from among the plurality of the workpieces W stacked on the workpiece placement platform 20.

In the embodiment described above, it has been described that the workpiece placement platform 20 includes the plurality of the workpiece placement units 30 and the storage unit 40 is arranged in the gap between the plurality of the workpiece placement units 30. However, the present invention is not limited to this. Various arbitrary configurations can be adopted such as the one in which the storage unit 40 is provided adjacent to an outside of the workpiece placement unit 30.

In the embodiment described above, the storage unit 40 has been described as the one including the support column 42 that extends in the direction intersecting with the workpiece placement platform 20 and the hanging unit 44 that extends in the direction intersecting with the extending direction of the support column 42. However, the present invention is not limited to this. Various arbitrary configurations can be adopted as long as the storage unit 40 is configured to be able to store the extending robot hand 200. For example, the storage unit 40 may be a wall surface or a floor board.

In the embodiment described above, the hanging unit 44 has been described as the one configured to be able to hang the connection unit 230 of the extending robot hand 200. However, the present invention is not limited to this. For example, the hanging unit 44 may be configured to be able to hang the first extending hand unit 210 or the second extending hand unit 220 of the extending robot hand 200.

In the embodiment described above, the workpiece supply robot 10 has been described on the assumption that it is a gantry type robot. However, the present invention is not limited to this. The workpiece supply robot 10 may be, for example, a six-axis articulated robot or the like. If the workpiece supply robot 10 is the six-axis articulated robot, the support arm 50 corresponds to an arm unit that constitutes a robot arm of the six-axis articulated robot.

In the embodiment described above, the suction pad 142 of the suction unit 140 and the suction pad for lifting-up 162 of the suction unit for lifting-up 160 of the permanent robot hand 100 have been described as different suction pads. However, the present invention is not limited to this. The suction pad 142 and the suction pad for lifting-up 162 may be the same suction pad. In a similar manner, the suction pad 252 of the suction unit 250 and the suction pad for lifting-up 262 of the suction unit for lifting-up 260 of the extending robot hand 200 may be the same suction pad.

In the embodiment described above, the second extending hand unit 220 of the extending robot hand 200 has been described as having a different configuration from the first extending hand unit 210 thereof. However, the present invention is not limited to this. The second extending hand unit 220 may have the same configuration as the first extending hand unit 210.

The air cylinder 130 and the air cylinder for lifting-up 150 of the permanent robot hand 100 and the buffer air cylinder 272 of the extending robot hand 200 have been described as the single-acting air cylinders. However, the present invention is not limited to this. These air cylinders may be, for example, double-acting air cylinders.

Reference Signs List

1 Workpiece supply system
10 Workpiece supply robot
20 Workpiece placement platform
30 Workpiece placement unit
40 Storage unit
42 Support column

44 Hanging unit
46 Positioning hole
48 Guide roller
50 Support arm
52 Side surface of support arm
60 Base frame
62 First frame unit
64 Second frame unit
70 Movable frame
72 Third frame unit
74 Fourth frame unit
80 Carriage
90 Core unit
100 Permanent robot hand
102 Permanent cover
110 Permanent side removable unit
112 Permanent side pedestal
114 Convex type connection unit
120 Permanent hand unit
130 Air cylinder
132 Piston rod
134 Cylinder tube
136 Head cover
**136*a*** Rectangular portion
**136*b*** Cylindrical portion
140 Suction unit
142 Suction pad
150 Air cylinder for lifting-up
152 Piston rod for lifting-up
154 Cylinder tube for lifting-up
156 Head cover for lifting-up
**156*a*** Rectangular portion
**156*b*** Cylindrical portion
160 Suction unit for lifting-up
162 Suction pad for lifting-up
170 Surface detection unit
180 Material detection unit
190 Stroke control mechanism
200 Extending robot hand
210 First extending hand unit
212 First extending hand cover
220 Second extending hand unit
222 Second extending hand cover
230 Connection unit
232 Base unit
233 Surface of base unit
234 Rear surface of base unit
236 Hanging unit
238 Positioning pin
240 Extending side removable unit
242 Extending side pedestal
244 Concave type connection unit
250 Suction unit
252 Suction pad
260 Suction unit for lifting-up
262 Suction pad for lifting-up
270 Buffer mechanism
272 Buffer air cylinder
276 Connection fitting
280 Spring-loaded shaft
282 Shaft unit
284 Spring unit
290 Spring-loaded shaft for lifting-up
292 Shaft unit
294 Spring unit
W Workpiece

The invention claimed is:

1. A workpiece supply robot comprising:
a support arm;
a permanent robot hand fixedly provided to the support arm, and configured to hold a workpiece placed on a workpiece placement platform; and
an extending robot hand configured to hold the workpiece together with the permanent robot hand, wherein
the workpiece supply robot is configured to be able to transport the workpiece from the workpiece placement platform, and
the extending robot hand is configured to be removable and comprises a first extending hand unit and a second extending hand unit opposed to each other with the permanent robot hand between the first extending hand unit and the second extending hand unit; wherein the support arm includes a permanent side removable unit from which the extending robot hand is removable, the extending robot hand includes an extending side removable unit capable of being connected to the permanent side removable unit, electric power is supplied from the permanent robot hand via the extending side removable unit and the extending robot hand further includes a connection unit configured to connect the first extending hand unit and the second extending hand unit, and the extending side removable unit is provided to the connection unit.

2. The workpiece supply robot according to claim 1, wherein
the permanent side removable unit is provided to a side surface of the support arm, and
the extending side removable unit is connected to the permanent side removable unit from a horizontal direction.

3. The workpiece supply robot according to claim 1, wherein the extending robot hand is arranged in a bilaterally symmetrical manner with the extending side removable unit as a center.

4. The workpiece supply robot according to claim 1, wherein
the permanent robot hand includes a surface detection unit, and
the surface detection unit is configured to be able to detect a surface of the workpiece.

5. The workpiece supply robot according to claim 1, wherein
the permanent robot hand includes a material detection unit, and
the material detection unit is configured to be able to detect whether or not the workpiece is placed on the workpiece placement platform.

6. The workpiece supply robot according to claim 1, wherein the permanent robot hand is configured to lift up one end of an uppermost workpiece from among a plurality of the workpieces stacked on the workpiece placement platform.

7. The workpiece supply robot according to claim 1, wherein the extending robot hand is configured to lift up one end of an uppermost workpiece from among the plurality of the workpieces stacked on the workpiece placement platform.

8. A workpiece supply system comprising:
a workpiece supply robot according to claim 1; and
a workpiece placement platform, wherein
the workpiece placement platform includes a storage unit for storing the extending robot hand.

9. The workpiece supply system according to claim 8, wherein the workpiece placement platform includes a plurality of workpiece placement units, and the storage unit is arranged in a gap between the plurality of the workpiece placement units.

10. The workpiece supply system according to claim 8, wherein the storage unit includes:

a support column extending in a direction intersecting with the workpiece placement platform; and a hanging unit extending in a direction intersecting with an extending direction of the support column.

11. The workpiece supply system according to claim 10, wherein the extending robot hand further includes:

a first extending hand unit and a second extending hand unit opposed to each other with the permanent robot hand between the first extending hand unit and the second extending hand unit; and a connection unit configured to connect the first extending hand unit and the second extending hand unit;

the extending side removable unit is provided to the connection unit, and the hanging unit is configured to be able to hang the connection unit of the extending robot hand.

* * * * *